United States Patent [19]

Sellmaier et al.

[11] 3,757,582
[45] Sept. 11, 1973

[54] TUBULAR SPRING ELEMENT AND A METHOD OF PRODUCING THE SAME

[76] Inventors: Englebert Sellmaier, 8242 Bischofseiwsen, Loipler; Wolfgang Hartling, 824 Schonau, Haus Waltraud; Helmut Schnurr, 8242 Bischofswiesen, Rosspointweg, all of Germany

[22] Filed: Feb. 7, 1972

[21] Appl. No.: 224,112

[30] Foreign Application Priority Data
Aug. 10, 1971 Germany .................. P 21 40 086.2

[52] U.S. Cl. ................................................. 73/418
[51] Int. Cl. ............................................. G01l 7/04
[58] Field of Search .................... 73/418, 411, 412, 73/413, 414, 415, 416, 417

[56] References Cited
UNITED STATES PATENTS
2,934,729  3/1960  Bourns ................................ 73/411
3,527,102  9/1970  Harland ............................... 73/416

*Primary Examiner*—Donald O. Woodiel
*Attorney*—Jordan B. Bierman et al.

[57] ABSTRACT

A tubular spring having a first end and a second end is fixed at its first end in a plastic holder. The plastic holder has a central passage. The second end is closed by a terminal fitting. The interior of the tubular spring communicates with the passage in the holder but is otherwise sealed in relation to the outside atmosphere.

The tubular spring is fixed within the holder by injection molding the holder about the first end of the spring. An insert may be disposed within the portion of the tubular spring within the holder to prevent deformation of the spring. Alternatively, a removable filler material may be introduced into the tubular spring and removed after the injection molding step.

25 Claims, 12 Drawing Figures

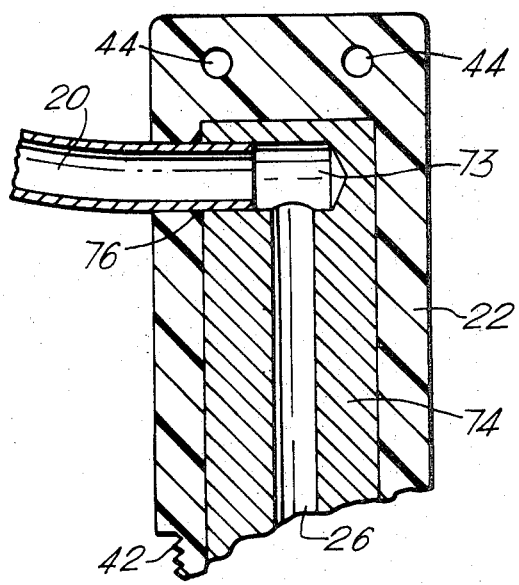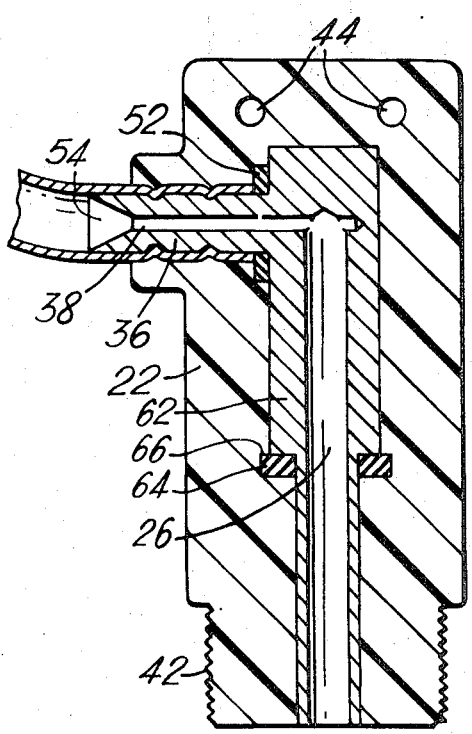

Patented Sept. 11, 1973  3,757,582
3 Sheets-Sheet 1
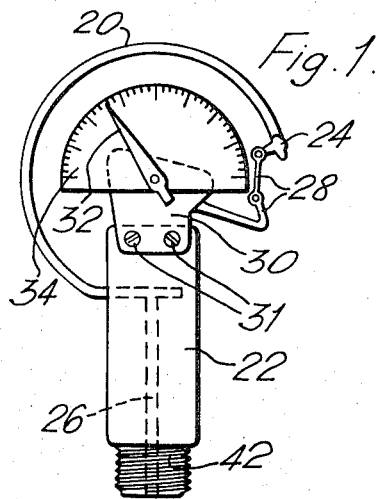
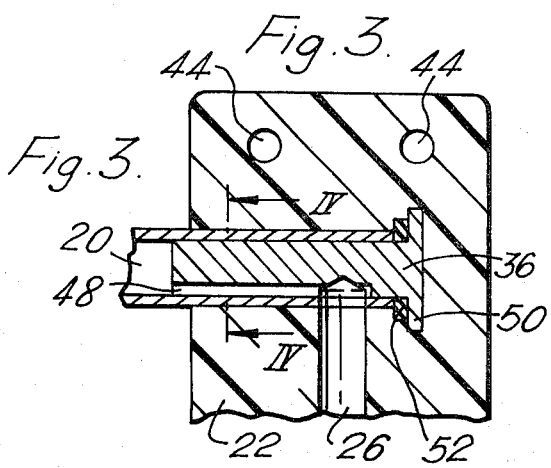
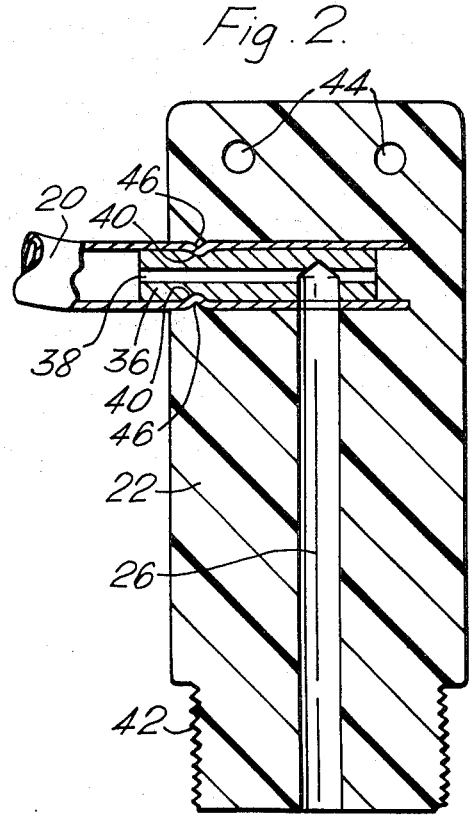
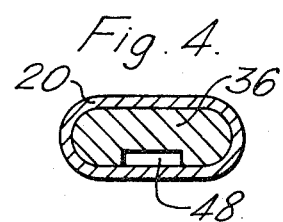
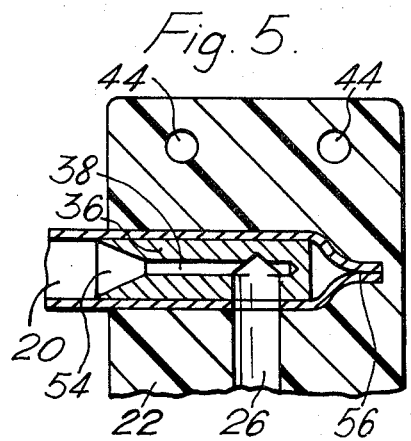

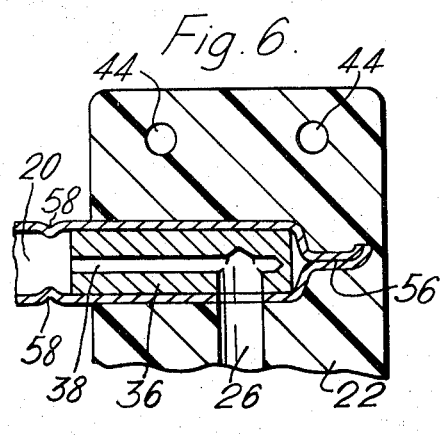
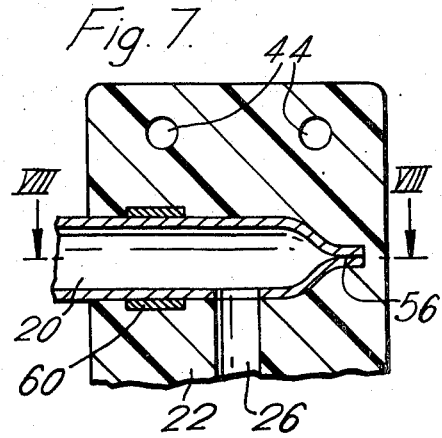
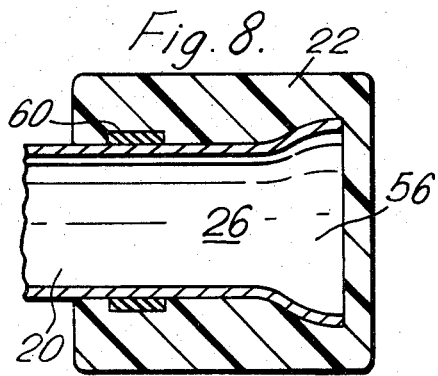
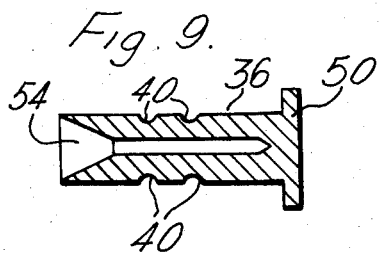
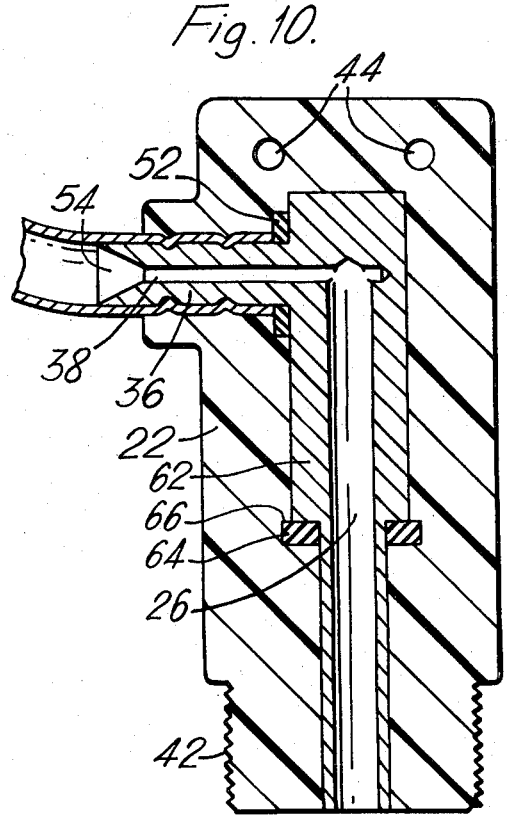

Patented Sept. 11, 1973

TUBULAR SPRING ELEMENT AND A METHOD OF PRODUCING THE SAME

This invention relates to a tubular spring element, as used in measuring instruments, such as, more particularly, pressure gauges, hydrometers, barometers or thermometers.

In such measuring instruments the element which responds to the measured quantity, viz. the pressure or temperature, usually consists of a so-called bourdon tube which is a roughly circularly arched tubular spring of approximately oval cross-section, one end of which is secured in a holder, and the other end of which is sealed by a terminal fitting. The interior of the tubular spring element communicates with a passage through the holder, but is otherwise sealed in relation to the outside atmosphere. The pressure of a fluid entering the interior of the tubular spring element through the holder, or the pressure generated by a temperature change, causes the tube, which is arched in position of rest, to somewhat straighten out, the resultant deflection of its free end, depending upon the magnitude of the quantity that is to be measured, being indicated for example by a pointer on a scale. Instead of a bourdon tube the measuring element may also have the form of a tubular element which is helically or spirally coiled or bent in some other way, and which may have a round, oval or other cross-section.

In conventional bourdon tubes the tubular spring element usually consists of a brass or bronze strip. The fixed end is soldered into a holder made of brass, stainless steel or some other metal. The terminal fitting at the other end of the tube likewise consists of a soldered part made of brass, stainless steel or some other metal.

This known form of construction of bourdon tubes has the following drawbacks. The metal used for the holder and the terminal fitting is relatively expensive and heavy. The holder is usually made of a blank cut off a bar section and, in addition to the drilling of the internal passage, a slit for fitting the tube, external threads and other holes for the affixation of the indicating linkage must be provided and other machining operations consecutively performed. The production of the holder therefore takes time. Another very important drawback of conventional bourdon tubes is that the heat generated when the tube is soldered into the holder and when the terminal member is soldered to the other end of the tube affects the characteristics of the bourdon tube in an uncontrollable manner. Owing to these unpredictable effects each bourdon tube manufactured in a major production run or by mass production methods will therefore exhibit slightly differing measuring characteristics. Each element must therefore be separately calibrated, a necessity which it is clearly desirable to avoid, particularly in a mass-produced article. Yet another drawback of the conventional arrangement is that it is practically impossible to attach the holder and the terminal fitting to the ends of the bourdon tube by soldering, so that the relation between the parts is always exactly the same. Again, this circumstance makes subsequent readjustment of each element unavoidable.

It is the object of the present invention to eliminate the above-mentioned short-comings and to provide an improved tubular spring element which is substantially lighter in weight, and which can be produced at much lower cost with far greater precision than a conventional element.

According to the present invention, a tubular spring element of the specified kind comprises a tubular spring, one end of which is fixed in a holder, and the other end of which is closed by a terminal fitting, the interior of the tubular spring communicating with a passage extending through the holder, but being otherwise sealed in relation to the outside atmosphere, and the holder (and preferably also the terminal fitting) is made of a synthetic plastic material, preferably by injection molding around the respective end of the tubular spring.

In widely different fields of technology it is already a well known step to substitute plastics for previously used traditional materials. However, in the case of bourdon tubes and like tubular spring elements this has never been done, because the embedment of the ends of the tube in a plastic material, particularly by injection molding the plastic around the ends of the tube, results in so much deformation and compressional damage that unless special precautions are taken, the tubes become useless, especially in the case of the light weight bourdon tubes that are needed for measuring lower pressures.

In a preferred form of the invention the end of the tubular spring around which the plastic holder is injection molded is provided with means which protect the tubular element against deformation whilst the molding process takes place, and which preferably additionally also serves to secure the tube in the holder. Such means may consist of a rigid insert having a longitudinal bore, which is fitted into the appropriate end of the tube. Preferably, this rigid insert extends inside the tube beyond the exterior of the holder, so as to protect the tube against deformation by the injection mold which also embraces the tube outside the holder.

Conveniently, the tube may be provided with additional means for holding and stabilizing the insert. Such additional means may in part or exclusively consist in that the end of the tubular spring is pinched together to form a widened flat beak, which is preferably bent at an angle to the tube.

In another arrangement the said additional means may consist in introducing into the end of the tubular spring, before it is embedded in the injection molding, a filler, such as wax, salt, washing powder or some other meltable or soluble medium which can be melted or dissolved out when the injection molding operation has been completed.

With advantage the holder and the terminal fitting may be molded simultaneously around the respective ends of the tubular spring in the same mold. This ensures that the parts attached to the ends of the tubular spring between which the measuring system is disposed will constitute firmly located reference points.

Other details and advantages of the invention will be understood as the following particular description of preferred embodiments shown in the drawings proceeds. In the drawings, FIG. 1 is an elevation of a bourdon tube shown in association with a linkage, pointer and scale to illustrate its principle of operation;

FIG. 2 shows the bourdon tube holder and part of the inserted tube, in section on a larger scale;

FIG. 3 shows in section part of a different embodiment of the holder and of the bourdon tube;

FIG. 4 is a section of the bourdon tube taken on the line IV—IV in FIG. 3;

FIGS. 5 to 7 are other variants of the part illustrated in FIG. 2;

FIG. 8 is a section of the embodiment according to FIG. 7, taken on the line VIII—VIII;

FIG. 9 is a detail view of a modified insert to be fitted into one end of the bourdon tube; and FIGS. 10 to 12 are views similar to FIG. 2 showing other ways of fixing the end of the bourdon tube in the holder.

Figure 11:
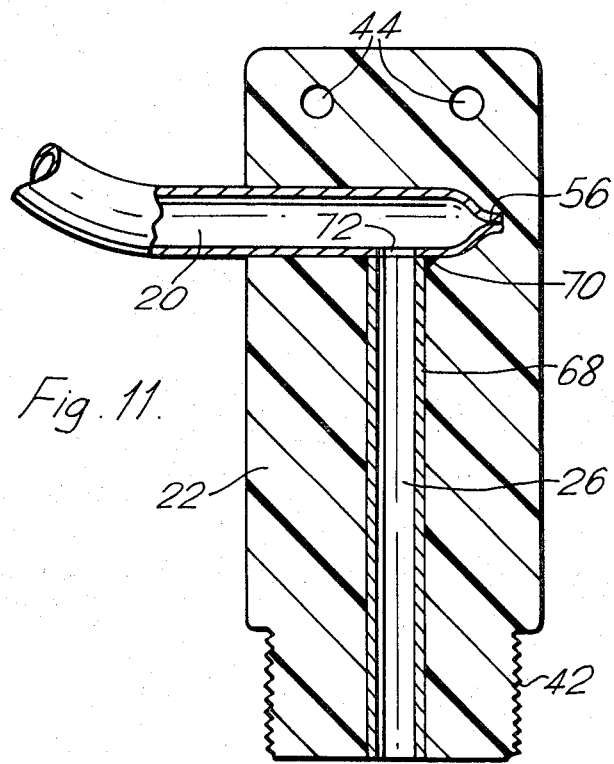

Referring to FIG. 1, a tubular spring element which here has the form of a bourdon tube comprises a bourdon tube 20 proper, one end of which is fixed in a holder 22. The other end is sealed by a terminal fitting 24. A passage 26 which extends through the holder 22 communicates with the interior of the bourdon tube 20. If the bourdon tube 20 which in the illustrated embodiment is roughly circularly arched and normally has an oval cross-section is subjected to a pressure or a temperature increase, it will straighten to a given extent, causing the terminal fitting 24 to be deflected in the upward direction, as seen in FIG. 1. This deflection is transmitted by a linkage 28 to an indicating head 30, which is attached for instance by screw means 31 to the upper end of the holder 22. The measured quantity is indicated by a pointer 32 which pivots in the indicating head 30 and which moves across a calibrated scale 34.

The bourdon gauge so far described including the linkage, the indicating head and the pointer, is well known in the art. The bourdon tube 20 may have a circular, oval, lenticular, polygonal or other corss-section and it may be arcuate as shown, or curved in the form of a spiral or a helix, or bent in some other way in one or more planes. The bourdon tube itself is made of metal, usually of brass or bronze strip. When used as a pressure gauge a bourdon tube can be used for measuring pressures from less than one kilopond/sq.cm to several thousand kiloponds/sq.cm.

The holder 22 and preferably the terminal fitting 24 are made of a synthetic plastic material and both these parts 22 and 24 are injection molded around the respective ends of the bourdon tube. Injection molding is nowadays done at pressures between about 60 and 90 kilopond/sq.cm. In order to protect the bourdon tubes, particularly more delicate bourdon tubes, against deformation whilst the holder is being molded, a suitable insert is first introduced into the appropriate end of the tube. This insert may have various shapes and, if suitably disposed and/or appropriately designed, it may also assist in fixing the bourdon tube in the holder. A few possible forms of construction of such an insert 36 are illustrated in FIGS. 2 to 6, 9 and 10. The cross-section of the insert 36 approximately conforms to the internal cross-section of the bourdon tube 20.

In FIG. 2 the insert 36 has a central axial bore 38 which is closed at one end by the holder 22 and traverses a substantial part of the length of the insert. The circumferential surface of the insert 36 is provided with one or more peripherally and/or axially distributed dimples 40 (cf. also FIGS. 9 and 10). Instead of dimples 40, one or more annular grooves could be provided.

The insert 36 is inserted into the smooth end of the previously bent bourdon tube, in such a way that the open end of the axial bore 38 communicates with the interior of the bourdon tube 20. The insert 36 may be additionally secured inside the end of the bourdon tube by means of an adhesive, or by being soldered or welded or by some other bond. The end of the bourdon tube 20 containing the insert 36 is then introduced into an injection mold (not shown). The axial length of the insert 36 and its disposition inside the bourdon tube 20 are so chosen that the tube cannot be deformed by the surrounding injection mold, i.e. that the insert 36 extends inside the bourdon tube 20 to a point beyond the exterior of the holder that is to be molded. The mold is so designed that threads 42 for securing the holder 22, and with it the entire bourdon gauge are formed on the bottom end of the holder, as well as holes 44 in the upper end of the holder for the reception of fastening elements such as screws 31. During the injection molding operation, the pressure of the synthetic plastic material forces the metal wall of the bourdon tube 20 into the dimples or annular grooves 40, and pimples or corrugations 46 are thus formed in the wall of the tube 20, which fix it in the holder 22 and secure the insert 36 in the bourdon tube 20. Finally, a hole is drilled axially through the passage 26 and the holder 22 and transversely through the wall of the bourdon tube 20 into the side insert 36 until it intersects with the axial bore 38 and communication is established between the passage 26 and the interior of the bourbon tube 20 via the bore 38.

FIGS. 3 and 4 show another form of the insert 36. In this insert communication between the passage 26 in the holder 22 and the interior of the bourdon tube 20 is established by an axial channel 48 formed in the peripheral surface of the insert. Moreover, the end of the insert 36 remote from the inside of the bourdon tube 20 is formed with a flange 50 which fixes the insert and hence the bourdon tube 20 in the holder 22. In order to prevent the measuring fluid from escaping from the end of the bourdon tube 20 through a clearance gap that may be present between the outside of the tube and the plastic body of the holder 22, a flexible washer 52 may be interposed between the end of the tube 20 and the inside of the flange 50.

In the modified embodiment shown in FIG. 5 the end of the insert facing the interior of the bourdon tube 20 is provided with a nozzle-like divergent opening 54 at the end of its central axial bore 38. This divergent portion 54 causes the pressure of the measuring fluid to press this end of the insert 36 against the inside of the wall of the bourdon tube 20, thus improving fixation and the seal between the tube 20 and its holder 22. This effect will be the more pronounced the higher the measured pressure inside the bourdon tube.

Moreover, in FIG. 5, the end 56 of the bourdon tube 20 is pinched together to form a flattened beak. This creates a further seal for closing the interior of the bourdon tube. The pinched end 56 may also be adhesively secured, soldered, welded or made tight by other means. Pinching the end of the tube laterally widens the cross-section in the manner also shown in FIG. 8 in a similar embodiment. The formation of this beak also improves fixation of the bourdon tube 20 inside the body of the holder 22.

In FIG. 6 the flattened beak 56 of the bourdon tube 20 is additionally provided with an upward terminal bend to improve its sealing and locating effect. Moreover, FIG. 6 also illustrates another possible way of fixing the insert 36 in the bourdon tube 20. This consists in the provision of a pair of crimps 58 in the bourdon tube, so disposed that the end of the insert 36 facing the interior of the bourdon tube 20 will bear against these crimps or the corrugation.

The forms of the insert 36 that have already been described with reference to FIGS. 2 to 6 and that will yet be described with reference to FIGS. 9 and 10 are especially necessary when injection molding around the ends of delicate bourdon tubes, such as are used for measuring pressures up to 60 kilopond/sq.cm. In the case of more robust bourdon tubes 20 the insert may be omitted. Instead, the necessary strength may be imparted to the bourdon tube 20 by pinching together its end to form a beak 56, as illustrated in the embodiments according to FIGS. 7 and 8. As already mentioned by reference to FIGS. 5 and 6 the flat beak 56 may be additionally sealed and secured with an adhesive, by soldering, welding, or the like. Besides its sealing and locating effect the formation of a beak is a stabilizing step which prevents deformation of the end of the tube during the molding process.

In FIG. 7 an elastic sleeve 60 embraces the bourdon tube near its end. Particularly when there is shrinkage of the bourdon tube holder 22, this sleeve serves to maintain a seal and fixation between the bourdon tube 20 and its holder 22. Instead of an elastic sleeve 60, as shown in the drawing, the outside of the end of the bourdon tube 20 can be coated with an elastic bonding or sealing compound.

The several embodiments shown in FIGS. 2 to 8 of the connection between the bourdon tube and the holder are merely illustrative. The described features could be employed simultaneously in different combinations. Thus FIG. 9 shows an insert 36 which is provided with a flange 50 according to the embodiment shown in FIG. 3, as well as with dimples or grooves 40 as in the embodiment in FIG. 2, and with a divergent mouth 54 as in the embodiment according to FIG. 5.

Such an insert may additionally be fitted with the washer 52 of FIG. 3, and it may be secured in the end of a bourdon tube in a press fit, by means of an adhesive or by soldering or welding, and the outside of the end of the tube may be provided with a sleeve as shown in FIG. 8 or with some other elastic bonding or sealing compound.

FIG. 10 shows yet another arrangement of the connection between a bourdon tube 20 and its holder 22. In this instance the insert 36 which otherwise roughly has the shape already shown in FIG. 9 lacks a flange 50, instead of which it has a transverse extension 62 which contains the passage 26, and which thus provides the communicating channel through the entire holder 22. In addition to the sealing washer 52 described with reference to FIG. 3 another sealing washer 64 may be arranged to embrace a shoulder 66 formed on the angular extension 62. Besides forming a seal the two washers 52 and 64 also serve to locate the angular extension 62 at both its ends.

FIG. 11 shows an embodiment of the proposed bourdon tube in which a metal tube 68 affording the passage 26 is soldered, welded or otherwise attached to the bourdon tube 20 at 70. The passage 26 formed by the metal tube 68 communicates with the interior of the bourdon tube 20 through a hole 72 already previously provided in the tube. As described above, the end 56 of the bourdon tube 20 is pinched together and forms a beak which imparts to the tube a given degree of stability of shape. However, for the reasons that have already been given the arrangement in FIG. 11 is suitable only for more rugged types of bourdon tubes.

Figure 12:
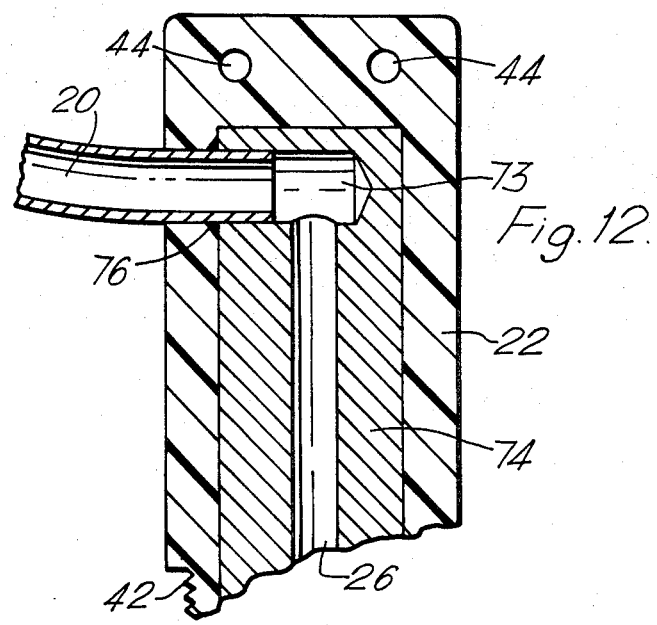

Finally, FIG. 12 shows another embodiment of the invention which somewhat resembles that described with reference to FIG. 11. In FIG. 12 the end of the bourdon tube 20 is inserted into a transverse bore 73 in a metal core 74 to which it is attached at 76 by an adhesive bond, solder, a weld seam or some other means. The transverse bore 73 communicates with an axial passage 26 through the metal core 74. In the arrangement according to FIG. 12, the bourdon tube 20 is sufficiently well supported by the metal core 74 and the joint at 76 to reduce the risk of deformation of the tube during injection molding. This embodiment is therefore also suitable for more delicate types of bourdon tubes.

In the various arrangements that have been described the penetration of the plastic material into the bourdon tube during the injection molding operation is prevented by the end of the tube being closed either by the presence of the insert or by being flattened to a beak formation, or both.

An alternative procedure which fulfills the same purpose as the previously described devices, i.e. which simultaneously seals the end of the bourdon tube against penetration of the plastic material during molding and prevents the end of the tube from being damaged by deformation, consists in first filling the bourdon tube with a soluble or meltable filler which, after the completion of the injection molding process, can be removed by being dissolved or melted out of the tube. Such a filler may be wax which is removed by melting, or a soluble substance such as a detergent powder which can be flushed out.

According to the invention the injection mold is so designed that the plastic holder 22 and the terminal fitting 24 can both be molded around the respective ends of the bourdon tube 20 at the same time in one operation. In a manner analogous to the steps taken for joining one end of the bourdon tube to the holder, the other end of the tube which is to be provided with the terminal fitting 24 is likewise closed with a corresponding insert or by pinching together the end before the injection molding process begins. The simultaneous molding of holder and terminal fitting in one injection mold has the advantage of saving time besides ensuring that the two terminal elements will automatically form exactly predetermined reference points for the measuring system (28, 30 in FIG. 1). In case of need, other elements, such as a casing, parts of the measuring head 30, the scale 32 and the like can be produced in the same molding operation. Instead of injection molding, which is the preferred method of production, the bourdon tube may also be inserted into or encast in or adhesively bonded with a plastic holder. The plastic may be of the polyacetal type.

As already indicated, the invention is not intended to be limited in scope to bourdon elements in the strict sense. It is also applicable to elements comprising expanding tubes that are helically, spirally or otherwise bent, and that have circular, oval or other cross-sections.

What is claimed is:

1. A tubular spring element for use in measuring instruments comprising a plastic holder having a central passage, a tubular spring having a first end and a second end, said spring being fixed in said holder at said first end, a terminal fitting at said second end for closing said second end, means for providing communication between the interior of the tubular spring communicating with and said passage means for sealing the spring to the holder including a seal between the first end of the spring and said holder, sealing being effected by injection moulding of the holder about the first end of the tubular spring.

2. The element according to claim 1, further including means, at said first end, for preventing deformation of the tubular spring during the injection molding of the pastic holder.

3. The element according to claim 2 wherein said means for preventing deformation also anchors the tubular spring in the holder.

4. The element according to claim 2, characterized in that the means for preventing deformation comprises an insert within said tubular spring at said first end, said insert having a bore which communicates with the interior of said tubular spring and with said passage.

5. The element according to claim 4 wherein said insert is rigid.

6. The element according to claim 4 wherein said bore is an axial bore.

7. The element according to claim 4 characterized in that the insert is press fit into the first end.

8. The element according to claim 7 further including means for fixing the insert in said first end.

9. The element according to claim 8 wherein said means for fixing comprises a crimp in that portion of the tubular spring adjacent the fitted insert, an adhesive bond, a solder point, or a weld.

10. The element according to claim 7, characterized in that the insert within the tubular spring extends into the spring to a point outside of the holder.

11. The element according to claim 4 characterized in that the insert has a flange which projects beyond the cross-section of the tubular spring.

12. The element according to claim 11, further including a sealing washer bearing against the flange on the insert and against the first end.

13. The element according to claim 4, characterized in that the tubular spring has a crimp in that portion of the spring adjacent the fitted insert and the insert has a complementary dimple or an annular groove in its external peripheral surface.

14. The element according to claim 4 characterized in that the insert has a divergent opening which communicates with the bore of the insert and with the interior of the tubular spring.

15. The element according to claim 14 characterized in that at least a part of the insert at said divergent opening is outside the holder.

16. The element according to claim 4 further including a depression in the outer surface of the tubular spring at a point in the spring lying outside the holder, said depression forming a corresponding projection on the inner surface of the tubular spring, said insert bearing against said projection.

17. The element according to claim 4 characterized in that a portion of the insert extends beyond the first end of the tubular spring into at least a part of the passage in the holder.

18. The element according to claim 17 characterized in that the portion of the insert extends through substantially the entire length of said passage.

19. The element according to claim 2 characterized in that the means for preventing deformation comprises a portion of said first end of the tubular spring which is pinched together flat and laterally widened to form a beak.

20. The element according to claim 19 characterized in that the beak has a bent end.

21. The element according to claim 2 further including an elastic sleeve embracing at least a portion of the length of said tubular spring within the holder.

22. The element according to claim 3 characterized in that the first end of the tubular spring is anchored in the holder and is externally coated with an elastic adhesive bonding or sealing compound.

23. The element according to claim 2 characterized in that said means comprises a removable filler material disposed within the portion of the tubular spring within the holder.

24. The element according to claim 2 wherein said means for preventing deformation comprises a metal core having a second bore therethrough, said core being disposed within and along the axis of the central passage of the holder, the first end communicating with the second bore.

25. The element according to claim 1 characterized in that the terminal fitting is of plastic and said plastic fitting is injection molded around the second end of the tubular spring to close said second end.

* * * * *